United States Patent

[11] 3,634,098

[72] Inventors John W. Rhoades;
 James W. Register, Jr.; John D. Millar, all of San Antonio, Tex.
[21] Appl. No. 828,364
[22] Filed May 27, 1969
[45] Patented Jan. 11, 1972
[73] Assignee The United States of America as represented by the Secretary of the Army

[54] FRESH APRICOT FLAVOR ADDITIVE COMPOSITION AND METHOD OF ENHANCING THE FLAVOR OF FREEZE-DEHYDRATED APRICOTS
 4 Claims, No Drawings

[52] U.S. Cl. ..................................... 99/140 R, 99/204
[51] Int. Cl. .................................... A23l 1/26
[50] Field of Search ............................. 99/140, 204, 140 R

[56] References Cited
 UNITED STATES PATENTS
 3,296,080 1/1967 Meuly ........................ 99/140 X
 3,511,668 5/1970 Vollink ....................... 99/204 X

OTHER REFERENCES

C. S. Tang et al., J. Agr. Food. Chem., 15(1), 24– 28 (1967).

*Primary Examiner*—Morris O. Wolk
*Assistant Examiner*—Sidney Marantz
*Attorneys*—Harry M. Saragovitz, Edward J. Kelly, Herbert Berl and Charles F. Murphy ABSTRACT: A composition of matter consisting essentially of nerol, geraniol, γ-decalactone, α-terpineol, and linalool for addition to freeze-dehydrated apricots during reconstitution thereof to enhance the flavor of the reconstituted apricots, method of enhancing the flavor of reconstituted freeze-dehydrated apricots by addition of said composition to freeze-dehydrated apricots during the reconstitution thereof, and reconstituted freeze-dehydrated apricots having substantially the flavor of fresh apricot prepared in accordance with said method.

FRESH APRICOT FLAVOR ADDITIVE COMPOSITION AND METHOD OF ENHANCING THE FLAVOR OF FREEZE-DEHYDRATED APRICOTS

The invention described herein may be manufactured, used, and licensed by or for the Government for governmental purposes without the payment to me of any royalty thereon.

This invention relates to a method of enhancing the flavor of reconstituted freeze-dehydrated apricots and to a composition of matter to be added to the apricots during reconstitution thereof or at any other suitable time to overcome the loss of flavor that occurs during freeze-dehydration.

When a fruit is freeze dehydrated for the purpose of preserving it, there is inevitably some loss of volatile flavor components. Consequently, the freeze-dehydrated fruit product, upon being reconstituted by the addition of water thereto, does not have as desirable flavor as the fresh fruit has.

An object of the present invention is to provide a method of enhancing the flavor of freeze-dehydrated apricots to make the reconstituted apricots taste substantially like fresh apricots.

Another object of the invention is to provide a composition of matter which when added to freeze-dehydrated apricots results in a reconstituted apricot product which has taste characteristics substantially like fresh apricots.

Other objects and advantages will appear from the following description of the invention, and the novel features will be particularly pointed out hereinafter in connection with the appended claims.

The objects of the invention are accomplished by preparing a mixture comprising flavor additives in the approximate ratios shown in table 1 and adding a preselected quantity of such a mixture to freeze-dehydrated apricots together with water during the reconstitution of the apricots.

TABLE I

Composition of Flavor Additive Mixture

| Flavor Additive | Parts By Weight |
| --- | --- |
| Nerol | 0.8 to 1.2 |
| Geraniol | 8 to 12 |
| γ-decalactone | 24 to 36 |
| α-terpineol | 48 to 72 |
| Linalool | 80 to 120 |

The preferred composition of the flavor additive mixture and the preferred concentration of the flavor additive ingredients in reconstituted apricots prepared in accordance with the invention are shown in table 2.

TABLE 2

Preferred Composition of Flavor Additive Mixture and Preferred Concentration in Reconstituted Apricots

| Flavor Additive | Composition (Parts by Weight) | Concentration in Reconstituted Apricots, Based on Reconstituted Weight of Apricots (p.p.m.) |
| --- | --- | --- |
| Nerol | 1 | 0.017 |
| Geraniol | 8 | 0.135 |
| γ-decalactone | 28 | 0.47 |
| α-terpineol | 55 | 0.93 |
| Linalool | 82 | 1.4 |

The flavor additive mixture, for convenience in adding it to the freeze-dehydrated apricots, may be encapsulated in an edible encapsulating material, for example according to methods such as those described in U.S. PAT. No. 3,015,128. Such capsules may be from about 1 micron to about 8,000 microns in diameter. Gelatin is one of the more commonly employed edible encapsulating materials.

The mixture of flavor additives may be prepackaged in encapsulated form with the freeze-dehydrated apricots in the desired proportions so that, when water or an aqueous solution of sugar or other sweetening agent is added to the freeze-dehydrated apricots in the desired proportion, a reconstituted apricot product is obtained after a predetermined time is allowed for rehydration of the apricots to occur, the reconstituted apricot product having a flavor very closely approximating that of fresh apricots and much more desirable than that of reconstituted freeze-dehydrated apricots to which no flavor additive has been added.

The flavor additive mixture may be added as a solution thereof in ethanol to the water or the aqueous solution of sugar or other sweetening agent used for reconstituting apricots prior to mixing the latter with the freeze-dehydrated apricots, if desired. In this case, the flavor additive mixture will be in liquid form and does not need to be encapsulated. However, very minute quantities of the flavor additive mixture are required to impart a desirable degree of flavor enhancement to the reconstituted apricots. Hence, it is necessary to have a suitable method for measuring the flavor additive mixture to be admixed; and this will be difficult for small quantities of freeze-dehydrated apricots in field rations if the flavor additive mixture is in liquid form.

Concerning the quantity of flavor additive mixture to be used, it has been pointed out above that only minute quantities are required to impart a substantially fresh fruit flavor to the reconstituted apricots. It is, of course, understood that flavor sensitivity varies from person to person such that the optimum concentration of flavor additive in reconstituted apricots for one person may be too great for another person and too small for yet another person. Table 2 shows the concentration, in parts per million, of the several flavor ingredients, based on the reconstituted weight of freeze-dehydrated apricots, which has been found to be generally desirable. However, these concentrations may vary as much as ±50 percent and still produce a quite acceptable reconstituted apricot product. In general, more than a 50 percent increase in the concentration of the flavor additive mixture in the reconstituted apricots would be very wasteful since such a concentration would greatly exceed that required to impart a substantially fresh apricot flavor to the reconstituted freeze-dehydrated apricots.

In reconstituting freeze-dehydrated apricots it is customary to employ ratios of water : sugar : freeze-dehydrated apricots of about 5.0 : 0.2 : 1.0 parts by weight respectively, although these ratios may also be varied considerably according to the tastes of those who are going to eat the reconstituted apricots, and according to the desired texture of the reconstituted apricot product. It is, of course, undesirable to employ too high a proportion of water relative to the other ingredients as this will result in too great a dilution of the apricot flavor components and of the sugar. Too little water will result in slow and perhaps incomplete reconstitution of the freeze-dehydrated apricots.

Having described our invention in general terms, we will now provide a detailed example of the invention, which is for the purpose of illustration and not for limitation of the invention.

EXAMPLE 1

To 1 pound of freeze-dehydrated apricot slices is added a syrup made by mixing with 5.0 pounds of water 0.2 pound of sugar and a precalculated quantity of an ethanol solution of a flavor additive mixture sufficient to incorporate in the reconstituted apricots the following concentrations of the ingredients of the flavor additive mixture, the concentrations being based on the reconstituted weight of the apricots:

| Ingredients of the flavor additive mixture | Concentration of each ingredient of the flavor additive mixture in the reconstituted apricots |
| --- | --- |

| | (parts per million based on reconstituted weight of the apricots) |
|---|---|
| Nerol | 0.017 |
| Geraniol | 0.135 |
| γ-decalactone | 0.47 |
| α-terpineol | 0.93 |
| Linalool | 1.4 |

The syrup was left in contact with the apricot slices, with occasional stirring, until substantially all of the syrup was absorbed in the apricots (about 30 minutes).

Another sample of 1 pound of freeze-dehydrated apricot slices was treated with a syrup made by mixing 0.2 pound of sugar with 5.0 pounds of water only and occasionally stirring the mixture until substantially all of the syrup was absorbed in the sliced apricots (about 30 minutes).

The reconstituted freeze-dehydrated apricot slices containing the flavor additive mixture were compared with the reconstituted freeze-dehydrated apricot slices which were reconstituted with sugar and water syrup only by a taste panel composed of four carefully selected experts in organoleptic discrimination. Every member of the taste panel selected the reconstituted apricot slices containing the flavor additive mixture as having a flavor more closely approximating that of fresh apricots and as being more desirable than the reconstituted apricot slices to which no flavor additive had been added during reconstitution thereof.

Other methods of incorporating the flavor additive mixture in the freeze-dehydrated apricots may be employed. The flavor additive mixture dissolved in ethanol may be sprayed on the surfaces of the freeze-dehydrated sliced apricots or it may be sprayed on the apricot slices prior to freeze dehydration thereof. It may also be incorporated in an edible water-soluble film, which may be cut into strips and added to the sugar and water syrup in the amount needed for enhancement of the flavor of the reconstituted apricots. Sodium carboxymethyl cellulose is quite suitable for such use. This method facilitates measurement of the quantity needed since it will be easy to determine the area of film needed for a given quantity of freeze-dehydrated apricot slices and given amounts of water and sugar. A most important requirement is that the flavor additive mixture be distributed throughout the reconstituted freeze-dehydrated apricots as uniformly as possible in the proportions indicated above. If it is added to the apricots prior to freeze dehydration thereof, it will probably need to be added in larger proportions than indicated above to compensate for any losses which may occur due to volatilization of some of the ingredients of the flavor additive mixture during freeze dehydration thereof.

The flavor additive mixture of the invention is very useful for improving the acceptability of freeze-dehydrated apricots. It may also be used for imparting an apricotlike flavor to other foods. For example, jams, preserves, or jellies can be made from other fruits or might even be made from bland vegetable materials, and flavored to taste very similar to fresh apricots by adding a suitable quantity of the flavor additive mixture of the invention to the jam, preserve, or jelly. Apple jelly, for example, normally does not have a very strong flavor of its own and its flavor could, therefore, be easily masked by the addition of the apricotlike flavor additive mixture of the invention thereto. Also, the flavor additive mixture dispersed throughout an edible water-soluble film can be used as a component of sandwiches to impart apricotlike flavor thereto. For example, a peanut butter sandwich having an edible water-soluble film containing the apricotlike flavor additive mixture laid on the peanut butter would provide desirable variety in peanut butter sandwiches, which conventionally are often made with jelly of some flavor desired by the consumer. The edible film containing the flavor additive mixture may be finely ground and the resulting powder or granules may be sprinkled on foods to impart varying amounts of apricotlike flavor thereto. Another use of the flavor additive mixture of the invention is in the form of an edible coating to which the flavor additive mixture has been added prior to coating bite size foods or food bars such as are used by the Armed Forces and for space flights. Gelatin coatings or other edible coatings for such foods may thus be made to taste similar to fresh apricots by adding the flavor additive mixture thereto.

We wish it to be understood that we do not desire to be limited to the exact details described, for obvious modifications will occur to a person skilled in the art.

We claim:

1. Method of enhancing the flavor of freeze-dehydrated apricot on reconstitution thereof which comprises the step of adding to said freeze-dehydrated apricot an amount of a flavor additive mixture sufficient to impart to said freeze-dehydrated apricot on reconstitution thereof substantially the flavor of fresh apricot, said flavor additive mixture consisting essentially of nerol, geraniol, γ-decalactone, α-terpineol, and linalool.

2. Method according to claim 1, wherein said nerol, geraniol, γ-decalactone, α-terpineol, and linallol are present in said flavor additive mixture in the ratios by weight of about 1 : 8 : 28 : 55 : 82 respectively.

3. Reconstituted freeze-dehydrated apricot having substantially the flavor of fresh apricot prepared according to the method of claim 1.

4. An apricotlike flavor additive mixture consisting essentially of the following composition by weight:

| nerol | 0.8 to 1.2 parts |
|---|---|
| geraniol | 8 to 12 parts |
| γ-decalactone | 24 to 36 parts |
| α-terpineol | 48 to 72 parts |
| linalool | 80 to 120 parts |

* * * * *